United States Patent
Vardi et al.

(10) Patent No.: US 8,224,981 B2
(45) Date of Patent: Jul. 17, 2012

(54) ACCELERATED MULTIMEDIA FILE DOWNLOAD AND PLAYBACK

(75) Inventors: Yosef Vardi, Tel Aviv (IL); Idan Feigenbaum, Haifa (IL); Fabian Ben Aderet, Tivon (IL)

(73) Assignee: Speedbit Ltd., Haifa (IL)

( * ) Notice: Subject to any disclaimer, the term of this patent is extended or adjusted under 35 U.S.C. 154(b) by 379 days.

(21) Appl. No.: 11/947,013

(22) Filed: Nov. 29, 2007

(65) Prior Publication Data

US 2008/0133771 A1 Jun. 5, 2008

Related U.S. Application Data

(60) Provisional application No. 60/867,834, filed on Nov. 30, 2006.

(51) Int. Cl.
*G06F 15/16* (2006.01)
(52) U.S. Cl. ......... 709/231; 709/219; 709/232; 709/233
(58) Field of Classification Search ................. 709/231, 709/232, 233, 219
See application file for complete search history.

(56) References Cited

U.S. PATENT DOCUMENTS

| | | |
|---|---|---|
| 4,912,628 A | 3/1990 | Briggs |
| 5,602,992 A | 2/1997 | Danneels |
| 5,768,528 A | 6/1998 | Stumm |
| 5,774,660 A | 6/1998 | Brendel et al. |
| 5,918,239 A | 6/1999 | Allen et al. |
| 5,926,624 A | 7/1999 | Katz et al. |
| 6,049,892 A | 4/2000 | Casagrande et al. |
| 6,052,819 A | 4/2000 | Barker et al. |
| 6,061,504 A | 5/2000 | Tzelnic et al. |
| 6,098,180 A | 8/2000 | Kobata et al. |
| 6,105,029 A | 8/2000 | Maddalozzo, Jr. et al. |

(Continued)

FOREIGN PATENT DOCUMENTS
WO WO9839707 9/1998

OTHER PUBLICATIONS

Rodriguez P et al: Parallel-access for mirror sites in the Internet, INFOCOM 2000. Nineteenth Annual Joint Conference of the IEEE Computer and Communications Societies. Proceedings. IEEE Tel Aviv, Israel, Mar. 26-30, 2000, Piscataway, NJ, USA, IEEE, US, vol. 2, pp. 864-873.

(Continued)

*Primary Examiner* — John Follansbee
*Assistant Examiner* — Nghi Tran
(74) *Attorney, Agent, or Firm* — Daniel J. Swirsky; AlphaPatent Associates Ltd.

(57) ABSTRACT

A multimedia file transfer system including a redirector configured to identify a request to access a multimedia file via a network at a specified network address, and an accelerator configured to respond to the request by identifying at least one physical data storage device on which at least a portion of the multimedia file is stored, establish a plurality of data transfer links via the network with any of the devices, download a different portion of the multimedia file via each of the data transfer links, where any of the portions are downloaded at least partly concurrently, and provide, at least partly concurrently with downloading any of the portions, downloaded multimedia file data to a multimedia file player in the order in which the data appear in the multimedia file.

28 Claims, 5 Drawing Sheets

U.S. PATENT DOCUMENTS

| | | | |
|---|---|---|---|
| 6,134,584 | A | 10/2000 | Chang et al. |
| 6,138,162 | A | 10/2000 | Pistriotto et al. |
| 6,178,460 | B1 | 1/2001 | Maddalozzo, Jr. et al. |
| 6,195,680 | B1 | 2/2001 | Goldszmidt et al. |
| 6,216,163 | B1 | 4/2001 | Bharali et al. |
| 6,304,909 | B1 | 10/2001 | Mullaly et al. |
| 6,339,785 | B1 | 1/2002 | Feigenbaum |
| 6,377,974 | B1 | 4/2002 | Feigenbaum |
| 6,381,709 | B1 | 4/2002 | Casagrande et al. |
| 6,385,673 | B1 | 5/2002 | DeMoney |
| 6,460,087 | B1 | 10/2002 | Saito et al. |
| 6,606,646 | B2 * | 8/2003 | Feigenbaum ............... 709/203 |
| 7,003,579 | B1 | 2/2006 | Johansson et al. |
| 7,555,559 | B2 | 6/2009 | Chapweske |
| 2002/0143979 | A1 | 10/2002 | Doucer et al. |
| 2002/0162112 | A1 * | 10/2002 | Javed ............................. 725/87 |
| 2003/0088689 | A1 * | 5/2003 | Alexander et al. ............ 709/232 |
| 2003/0154246 | A1 | 8/2003 | Ollikainen |
| 2004/0103208 | A1 * | 5/2004 | Chung et al. ................. 709/236 |
| 2004/0128396 | A1 * | 7/2004 | Patrick et al. ................. 709/231 |
| 2004/0172476 | A1 | 9/2004 | Chapweske |
| 2006/0174160 | A1 | 8/2006 | Kim |
| 2006/0271979 | A1 * | 11/2006 | Hejna, Jr. ......................... 725/89 |
| 2007/0268362 | A1 * | 11/2007 | West et al. ................. 348/14.15 |
| 2010/0235521 | A1 | 9/2010 | French |

OTHER PUBLICATIONS

Kirpal Andreas: Study of Parallel-Access Schemes to Speed up the Internet, Diplomarbeit, Apr. 1999, pp. 1-75, TU Munchen.

Pablo Rodriguez et al.: Dynamic Parallel Access to Replicated Content in the Internet, Transactions on Networking, IEEE/ACM, New York, NY, US, vol. 10, No. 4, Aug. 1, 2002, pp. 455-465.

Lewontin Steve, Martin Elizabeth: Client Side Load Balancing for the Web, Proceedings of 6th International World Wide Web Conference, [Online], Apr. 7-11, 1997, pp. 1-7, Santa Clara, California.

Tan Ceryen, Mills Kevin: Performance characterization of decentralized algorithms for replica selection in distributed object systems, Proceedings of the 5th International Workshop on Software and Performance, WOSP05, [Online], Jul. 12-14, 2005, pp. 257-262, XP002538599, Palma de Mallorca, Spain.

Byers J W et al: Accessing multiple mirror sites in parallel: using Tornado codes to speed up downloads, INFOCOM, 99. Eighteenth Annual Joint Conference of the IEEE Computer and Communications Societies Proceedings. IEEE New York, NY, USA Mar. 21-25, 1999, Piscataway, NJ, USA, IEEE, US, vol. 1, Mar. 21, 1999, pp. 275-283.

Miu A et al: Hornet: Parallel Data Transfer From Multiple Servers, Oct. 1, 1999, pp. 1-4, XP002171262.

Myers A et al: Performance characteristics of mirror servers on the Internet, INFOCOM, 99. Eighteenth Annual Joint Conference of the IEEE Computer and Communications Societies Proceedings. IEEE New York, NY, USA, Mar. 21-25, 1999, Piscataway, NJ, USA, IEEE, US, vol. 1, pp. 304-312.

Kangasharju J et al: Locating Copies of Objects Using the Domain Name System, Proceedings of the International Caching Workshop, Jan. 1, 1999, pp. 1-12.

Carter R L et al: Server selection using dynamic path characterization in wide-area networks, INFOCOM, 97. Sixteenth Annual Joint Conference of the IEEE Computer and Communications Societies. Driving the Information Revolution, Proceedings IEEE.

Kobe, Japan, Apr. 7-11, 1997, Los Alamitos, CA, USA, IEEE Comput. Soc, US, vol. 3, pp. 1014-1021.

Byers et al.: A Digital Fountain Approach to Reliable Distribution of Bulk Data, ACM SIGCOMM, 98 Proceedings, Vancouver, British Columbia, Canada, Sep. 2-4, 1998, pp. 56-67.

Luotonen et al.: World-Wide Web proxies, Computer Networks and ISDN Systems 27 (1994), Elsevier Science Publishers B. V. Amsterdam, The Netherlands, pp. 147-154.

Miu et al.: Performance analysis of a dynamic parallel downloading scheme from mirror sites throughout the Internet, 6892 Term Paper, MIT Laboratory of Computer Science, Cambridge MA, Dec. 1, 1999, pp. 1-13.

J. Postel et al.: RFC 959 file transfer protocol, Network Working Group, Oct. 1985 (http://www.ietf.org/rfc/rfc0959.txt).

P. Hethmon: draft-ietf-ftpext-mlst-08: Extensions to FTP, FTPEXT Working Group, Internet Draft, Oct. 1999.

* cited by examiner

ACCELERATED MULTIMEDIA FILE DOWNLOAD AND PLAYBACK

CROSS-REFERENCE TO RELATED APPLICATIONS

This application claims priority from U.S. Provisional Patent Application No. 60/867,834, filed Nov. 30, 2006, and incorporated herein by reference in its entirety.

FIELD OF THE INVENTION

The present invention relates to computer networks in general, and more particularly to methods and apparatus for downloading and playing multimedia files.

BACKGROUND OF THE INVENTION

Transfer protocols for downloading files from serving computers (servers) to client computers (clients) via computer networks such as the Internet are well known in the art. Two commonly used transfer protocols include the File Transfer Protocol (FTP) and the Hypertext Transfer Protocol (HTTP). Generally speaking, in order to download a file, a client establishes a single data transfer link with a server during a file transfer session through which the contents of the file is transmitted from the server to the client.

Various file transfer protocols include the ability to begin downloading a file from a point other than the start of the file simply by instructing the server to begin transmitting the file from a specified byte offset. This has led to the development of file transfer software that is able to resume a download where the data transfer link has been broken in the middle of a download. The download is simply continued from the point at which the download stopped.

This ability to download a file in sections has led to the development of file transfer protocols in which multiple data transfer links are established with one or more servers where different portions of a single file, or duplicates of the file, are downloaded via the different data transfer links and reassembled at the client. This generally results in a file being downloaded to a client faster due to the greater cumulative throughput of multiple data transfer links with one or more servers as compared with that of a single data transfer link with one server. Unfortunately, in their current configuration, such protocols are not suited for downloading multimedia files that are to be played as they are being downloaded, rather than only after they are downloaded in their entirety and reassembled.

SUMMARY OF THE INVENTION

The present invention in embodiments thereof discloses methods and apparatus for downloading and playing multimedia files.

In one aspect of the present invention a multimedia file transfer system is provided including a redirector configured to identify a request to access a multimedia file via a network at a specified network address, and an accelerator configured to respond to the request by identifying at least one physical data storage device on which at least a portion of the multimedia file is stored, establish a plurality of data transfer links via the network with any of the devices, download a different portion of the multimedia file via each of the data transfer links, where any of the portions are downloaded at least partly concurrently, and provide, at least partly concurrently with downloading any of the portions, downloaded multimedia file data to a multimedia file player in the order in which the data appear in the multimedia file.

In another aspect of the present invention the accelerator is configured to indicate to any of the devices, to which the accelerator has established any of the data transfer links, a byte offset demarcating the beginning of a portion of the multimedia file to be downloaded, and the number of bytes in the portion to be downloaded.

In another aspect of the present invention the accelerator is configured to provide the downloaded multimedia file data to the multimedia file player after buffering a predefined amount of the data.

In another aspect of the present invention either of the redirector and the accelerator are implemented in either of computer hardware and computer software, and are embodied in a computer-readable medium.

In another aspect of the present invention either of the redirector and the accelerator are executed by either of a modem and a router.

In another aspect of the present invention the multimedia file player is assembled with either of the redirector and the accelerator.

In another aspect of the present invention the accelerator is configured to determine the size of a next portion of the multimedia file to be downloaded as the product of a download rate of the multimedia file and the amount of time remaining until all portions of the multimedia file preceding the next portion will have been played at a current play rate.

In another aspect of the present invention the download rate is any of the fastest download rate achieved at any time during the download of any portion of the multimedia file, the slowest download rate achieved at any time during the download of any portion of the multimedia file, the average download rate of all downloaded portions of the multimedia file, and the download rate of the most recently downloaded portion of the multimedia file.

In another aspect of the present invention the accelerator is configured to determine the size of a next portion of the multimedia file to be downloaded as $$\frac{PPS \times DR}{PR - DR}$$

where DR is a download rate of the multimedia file, PR is a current play rate of the multimedia file, and PPS is the amount of data yet to be played of all portions of the multimedia file preceding the next portion at the current play, and where PR>DR.

In another aspect of the present invention the accelerator is configured to provide the downloaded multimedia file data to the multimedia file player at a data transfer rate that is less than a download rate of the multimedia file.

In another aspect of the present invention the accelerator is configured to buffer the downloaded data until a predetermined buffer size is reached, whereupon the data transfer rate to the player is increased.

In another aspect of the present invention the buffer size is determined by the formula DR*FS/(PR+DR) where DR is a download rate of the multimedia file, PR is a current play rate of the multimedia file, and FS is the size of the multimedia file.

In another aspect of the present invention the accelerator is configured to download a remainder of the multimedia file in a plurality of equally-sized portions where a determined size of a next portion to be downloaded equals, exceeds, or comes within a predefined distance from the end of the multimedia file.

In another aspect of the present invention the accelerator is configured to download and buffer a predefined amount of the multimedia file if the player has finished playing all downloaded portions of the multimedia file while more of the multimedia file remains to be downloaded.

In another aspect of the present invention the accelerator is configured to determine the number of the data transfer links using the formula INT(PR/DR)+1 where DR is a download rate of the multimedia file and PR is a current play rate of the multimedia file.

In another aspect of the present invention a multimedia file transfer method is provided including identifying at least one physical data storage device on which at least a portion of a multimedia file is stored, establishing a plurality of data transfer links via the network with any of the devices, downloading a different portion of the multimedia file via each of the data transfer links, where any of the portions are downloaded at least partly concurrently, and providing, at least partly concurrently with downloading any of the portions, downloaded multimedia file data to a multimedia file player in the order in which the data appear in the multimedia file.

In another aspect of the present invention the method further includes indicating to any of the devices a byte offset demarcating the beginning of a portion of the multimedia file to be downloaded, and the number of bytes in the portion to be downloaded.

In another aspect of the present invention the method further includes providing the downloaded multimedia file data to the multimedia file player after buffering a predefined amount of the data.

In another aspect of the present invention the method further includes determining the size of a next portion of the multimedia file to be downloaded as the product of a download rate of the multimedia file and the amount of time remaining until all portions of the multimedia file preceding the next portion will have been played at a current play rate.

In another aspect of the present invention the determining step includes determining the download rate as any of the fastest download rate achieved at any time during the download of any portion of the multimedia file, the slowest download rate achieved at any time during the download of any portion of the multimedia file, the average download rate of all downloaded portions of the multimedia file, and the download rate of the most recently downloaded portion of the multimedia file.

In another aspect of the present invention the method further includes determining the size of a next portion of the multimedia file to be downloaded as $$\frac{PPS \times DR}{PR - DR}$$

where DR is a download rate of the multimedia file, PR is a current play rate of the multimedia file, and PPS is the amount of data yet to be played of all portions of the multimedia file preceding the next portion at the current play, and where PR>DR.

In another aspect of the present invention the method further includes providing the downloaded multimedia file data to the multimedia file player at a data transfer rate that is less than a download rate of the multimedia file.

In another aspect of the present invention the method further includes buffering the downloaded data until a predetermined buffer size is reached, whereupon the data transfer rate to the player is increased.

In another aspect of the present invention the method further includes determining the buffer size by the formula DR*FS/(PR+DR) where DR is a download rate of the multimedia file, PR is a current play rate of the multimedia file, and FS is the size of the multimedia file.

In another aspect of the present invention the method further includes downloading a remainder of the multimedia file in a plurality of equally-sized portions where a determined size of a next portion to be downloaded equals, exceeds, or comes within a predefined distance from the end of the multimedia file.

In another aspect of the present invention the method further includes downloading and buffering a predefined amount of the multimedia file if the player has finished playing all downloaded portions of the multimedia file while more of the multimedia file remains to be downloaded.

In another aspect of the present invention the method further includes determining the number of the data transfer links using the formula INT(PR/DR)+1 where DR is a download rate of the multimedia file and PR is a current play rate of the multimedia file.

It is noted throughout the specification and claims that the term "multimedia file" includes data files that contain audio data, video data, or any combination thereof.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
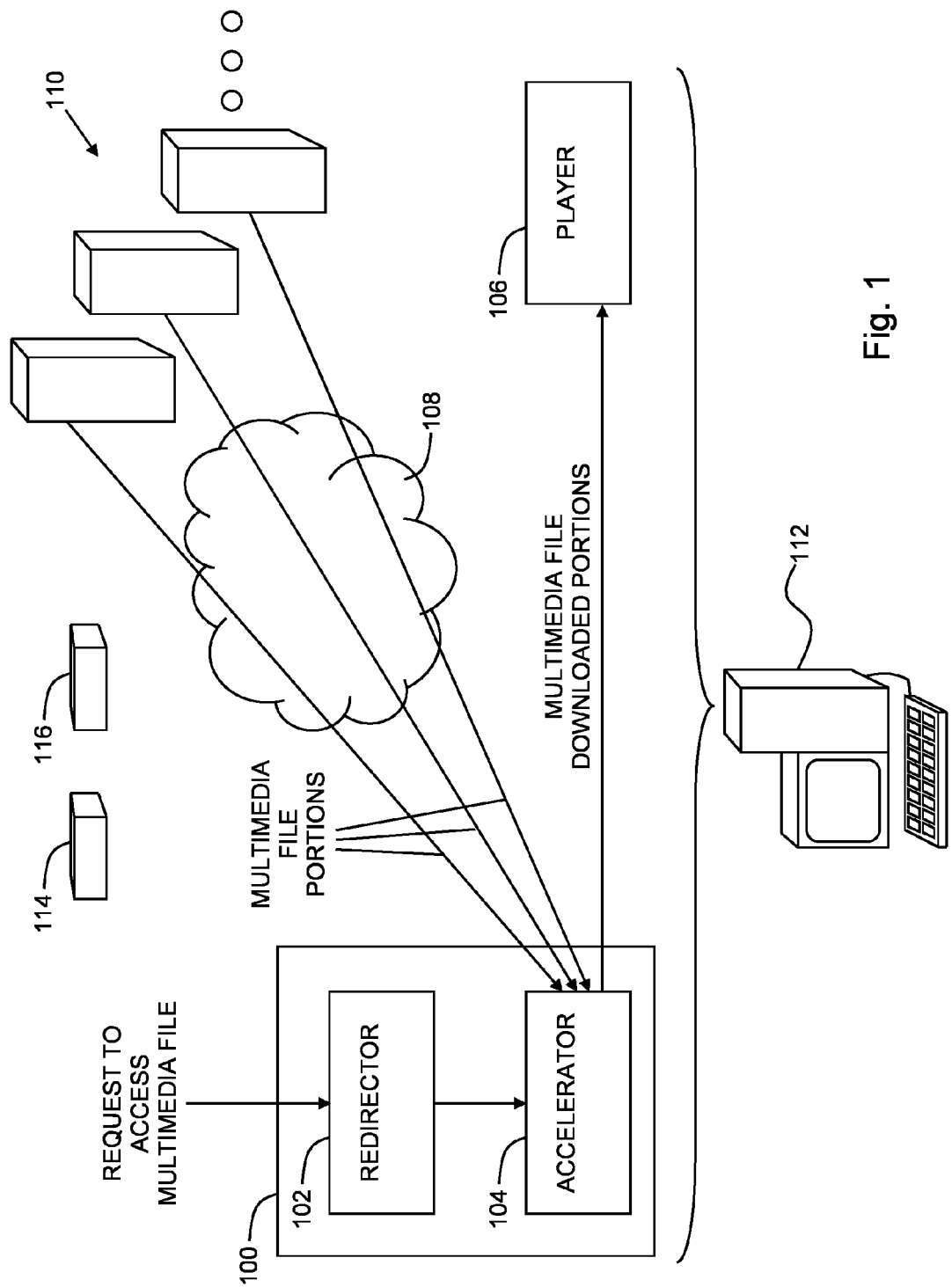
FIG. 1 is a simplified conceptual illustration of a multimedia file transfer system, constructed and operative in accordance with an embodiment of the present invention.
Figure 2:
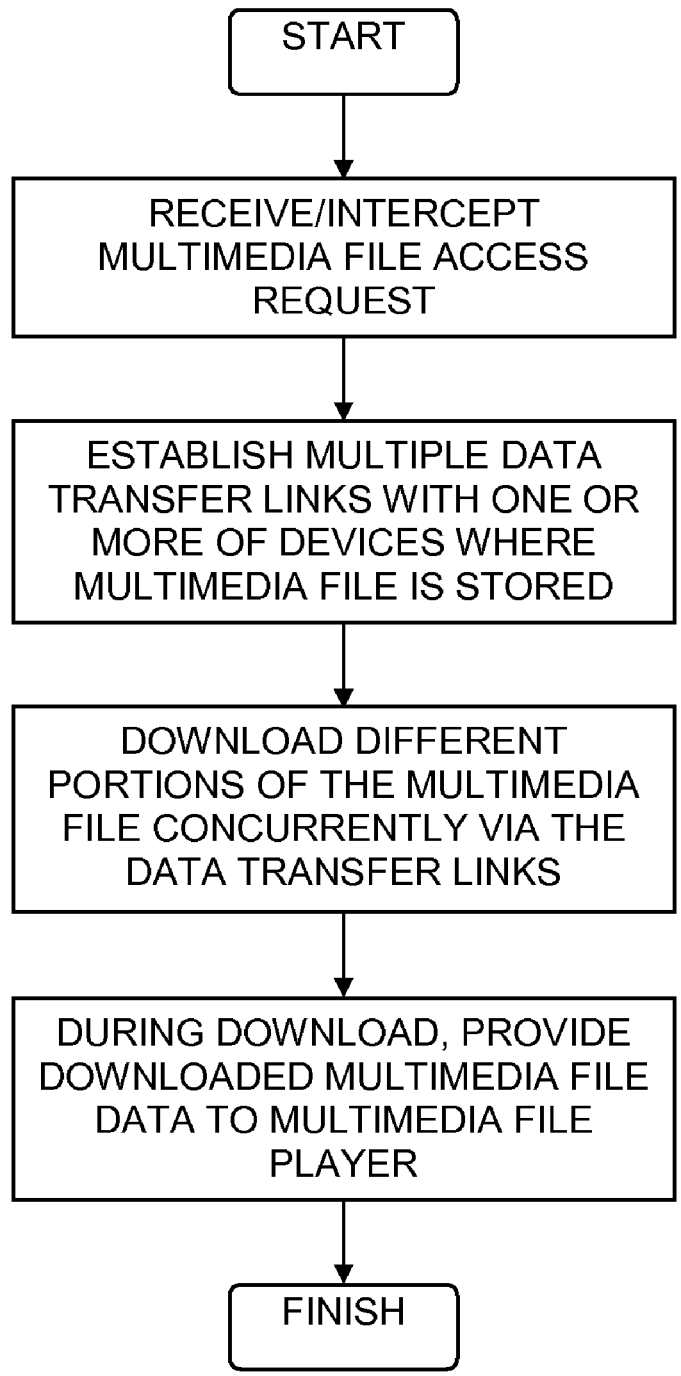
FIG. 2 is a simplified flowchart illustration of an exemplary method of operation of the system of FIG. 1, operative in accordance with an embodiment of the present invention.

Reference is now made to FIG. 1 which is a simplified conceptual illustration of a multimedia file transfer system, constructed and operative in accordance with an embodiment of the present invention, and additionally to FIG. 2 which is a simplified flowchart illustration of an exemplary method of operation of the system of FIG. 1, operative in accordance with an embodiment of the present invention. The system of FIG. 1 includes multimedia file transfer apparatus 100 having a redirector 102 and an accelerator 104. Redirector 102 is configured to identify received and/or intercepted requests made by or on behalf of a multimedia file player 106 to access a multimedia file via a network 108, such as the Internet, at a specified network address. This request may, for example, be made by a computer user by clicking on a Hypertext Markup Language (HTML) link in a web page within a browser running on the user's computer, where the link includes the location of a computer server on which the multimedia file may be found, and where clicking on the link also indicates to multimedia file player 106 to stand ready to play the multimedia file. Alternatively, the request may be made from within multimedia file player 106 itself using conventional techniques. The location may be represented through the use of a Universal Resource Locator (URL) or any other location indicator known in the art. After the request is made, redirector 102 instructs accelerator 104 to download the multimedia file. Using conventional techniques, accelerator 104 preferably identifies one or more physical data storage devices 110 on which portions or copies of the multimedia file are stored. For example, accelerator 104 may attempt to access the multimedia file at the location indicated in the request and receive in response a list of alternate locations for the same file or portions thereof. Accelerator 104 then establishes multiple data transfer links via network 108 with one or more of devices 110, which may be any type of computing device or data storage device, for the purpose of downloading the multimedia file. Any data transfer protocol may be used provided that it supports accelerator 104 specifying and downloading any portion of the multimedia file, such as where accelerator 104 indicates a byte offset demarcating the beginning of the portion, which may be any byte offset within the multimedia file, and indicates the number of bytes in the portion to be downloaded. Thus, accelerator 104 specifies and downloads a different portion of the same multimedia file via each of the data transfer links with devices 110, and preferably does so concurrently or partly concurrently.

Concurrent with accelerator 104 downloading one or more portions of the multimedia file, accelerator 104 preferably provides downloaded multimedia file data to multimedia file player 106 in the order in which the data appear in the multimedia file. In this manner, multimedia file player 106 may begin playing the multimedia file before accelerator 104 downloads the complete multimedia file. In alternative embodiments, accelerator 104 provides downloaded multimedia file data to multimedia file player 106 either immediately or after buffering a predefined amount of data, such as three seconds worth of data at the expected play rate.

In one embodiment multimedia file transfer apparatus 100 is executed by or otherwise accessible to a computer 112, such as by implementing any of the elements shown in FIG. 1 in computer hardware and/or in computer software embodied in a computer-readable medium. In another embodiment multimedia file transfer apparatus 100 is executed by or otherwise accessible to a modem 114 or a router 116 through which the multimedia file is downloaded by or on behalf of multimedia file player 106. In another embodiment multimedia file player 106 is executed by or otherwise accessible to computer 112. In another embodiment multimedia file player 106 is assembled with redirector 102 and/or accelerator 104.

Figure 3:
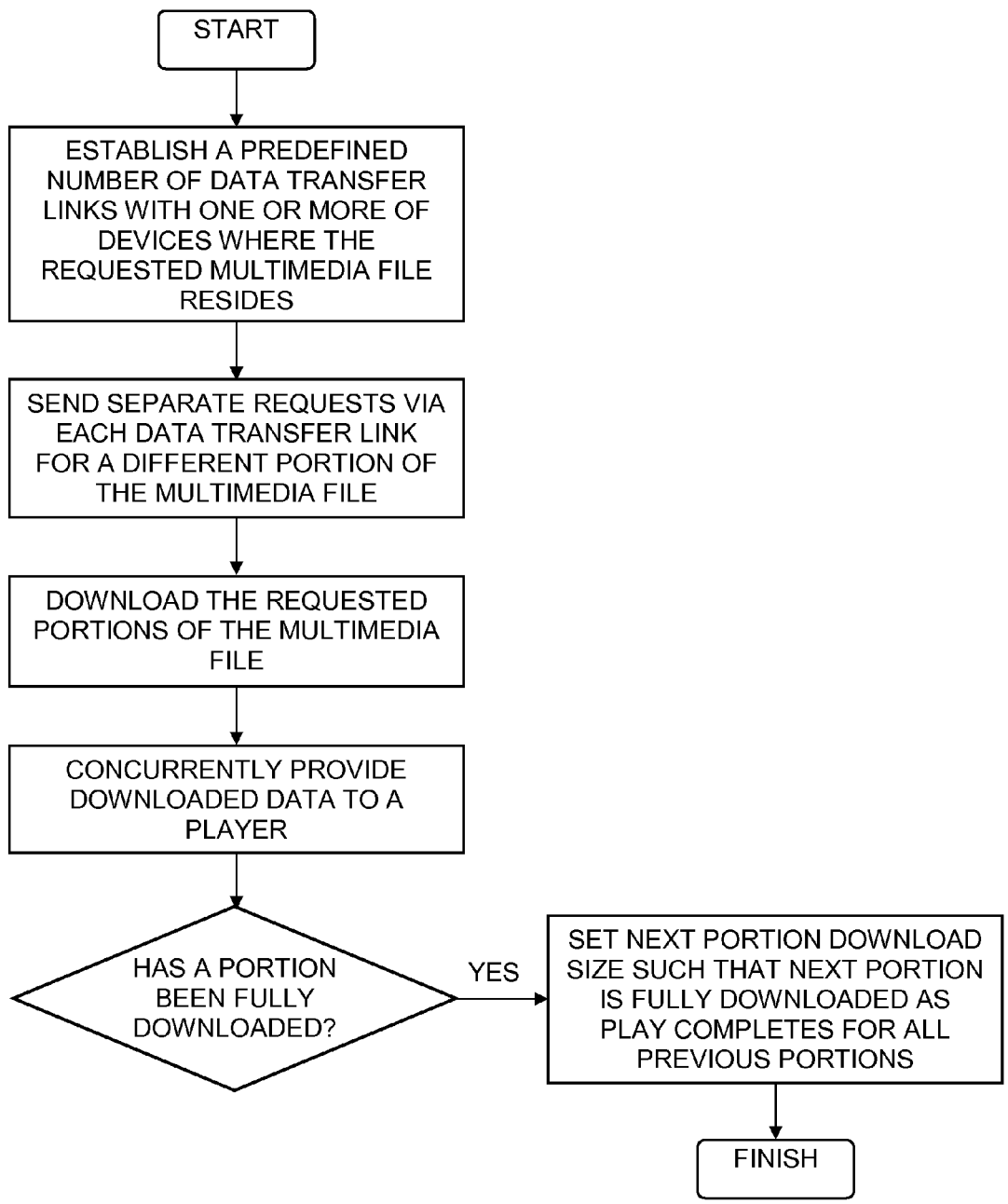
FIG. 3 is a simplified flowchart illustration of an exemplary method of operation of accelerator 104 of FIG. 1, operative in accordance with an embodiment of the present invention.

Reference is now made to FIG. 3 which is a simplified flowchart illustration of an exemplary method of operation of accelerator 104 of FIG. 1, operative in accordance with an embodiment of the present invention. In the method of FIG. 3, a predefined number of data transfer links, such as five, are established via network 108 with one or more of devices 110 where a requested multimedia file resides. Separate requests are then sent via each data transfer link for a different portion of the multimedia file, where each requested portion is of a predefined size, such as 110 kilobytes each. As the requested portions of the multimedia file are being downloaded via the data transfer links, already-downloaded data from multimedia file are provided for playback to multimedia file player 106. The data are provided to multimedia file player 106 in the order in which the data appear in the multimedia file, with the first byte of the multimedia file being provided to multimedia file player 106 before the second byte of the multimedia file is provided, and so on. It follows that all of the data from the first 110K portion of the multimedia file downloaded over one of the data transfer links are provided to multimedia file player 106 before any of the data from the second 110K portion of the multimedia file downloaded over another of the data transfer links are provided to multimedia file player 106. However, data from a given portion being downloaded may be provided to multimedia file player 106 before the entire portion is downloaded.

Once a portion has been fully downloaded via a data transfer link, the link is used to download another portion of the multimedia file that has not yet been downloaded, or in an alternative embodiment the link may be closed and a new link opened for this purpose. The size of a next portion of the multimedia file to be downloaded is determined as follows. Given the download rate (DR) at which the multimedia file is being downloaded (e.g., 110 Kbps), and the amount of time remaining (TR) until all portions of the multimedia file preceding the next portion to be downloaded will have been played (e.g., 7 seconds) at the current play rate (PR), the next portion size (NPS) may be determined such that it will be completely downloaded when TR has elapsed, i.e., when multimedia file player 106 is ready to play data from the next portion. In alternative embodiments, DR may be determined as the fastest download rate achieved at any time during the download of any portion of the multimedia file, the slowest download rate of any portion of the multimedia file, the average download rate of all portions of the multimedia file, or the download rate of the most recently downloaded portion. Thus, PS is given by the formula NPS=DR×TR (e.g., 7 sec× 110 Kbps=770 K).

Figure 4:
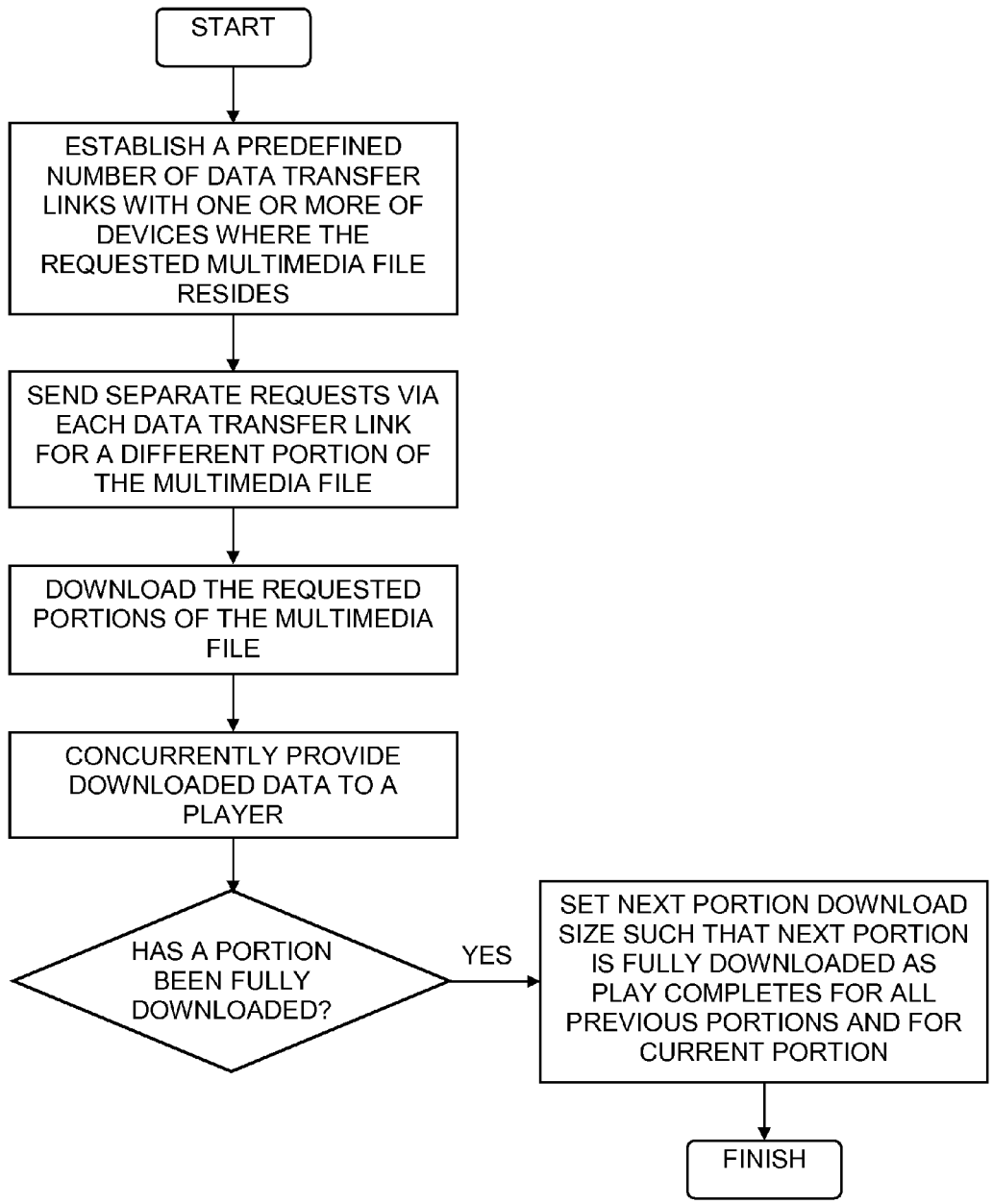
FIG. 4 is a simplified flowchart illustration of an alternative exemplary method of operation of accelerator 104 of FIG. 1, operative in accordance with an embodiment of the present invention.

Reference is now made to FIG. 4 which is a simplified flowchart illustration of an alternative exemplary method of operation of accelerator 104 of FIG. 1, operative in accordance with an embodiment of the present invention. The method of FIG. 4 is substantially similar to the method of FIG. 3 with the notable exception that given the download rate (DR) at which the multimedia file is being downloaded (e.g., 110 Kbps), the amount of data (e.g., 1,500 K) yet to be played of all previous portions (PPS) at the current play rate (PR) (e.g., 150 kilobytes/second), where PR>DR the next portion size (NPS) is determined such that the amount of time that it takes to download the next portion is equal to the amount of time that it takes to play both the data yet to be played of all previous portions as well as the data of the next portion. Thus, NPS is given by the formula:

$$\frac{PPS + NPS}{PR} = \frac{NPS}{DR}$$

which simplifies to:

$$NPS = \frac{PPS \times DR}{PR - DR}$$

Thus, in the current example:

$$NPS = \frac{1{,}500\text{K} \times 110\text{ Kbps}}{150\text{ Kbps} - 110\text{ Kbps}} = 4{,}125\text{K}$$

Figure 5:
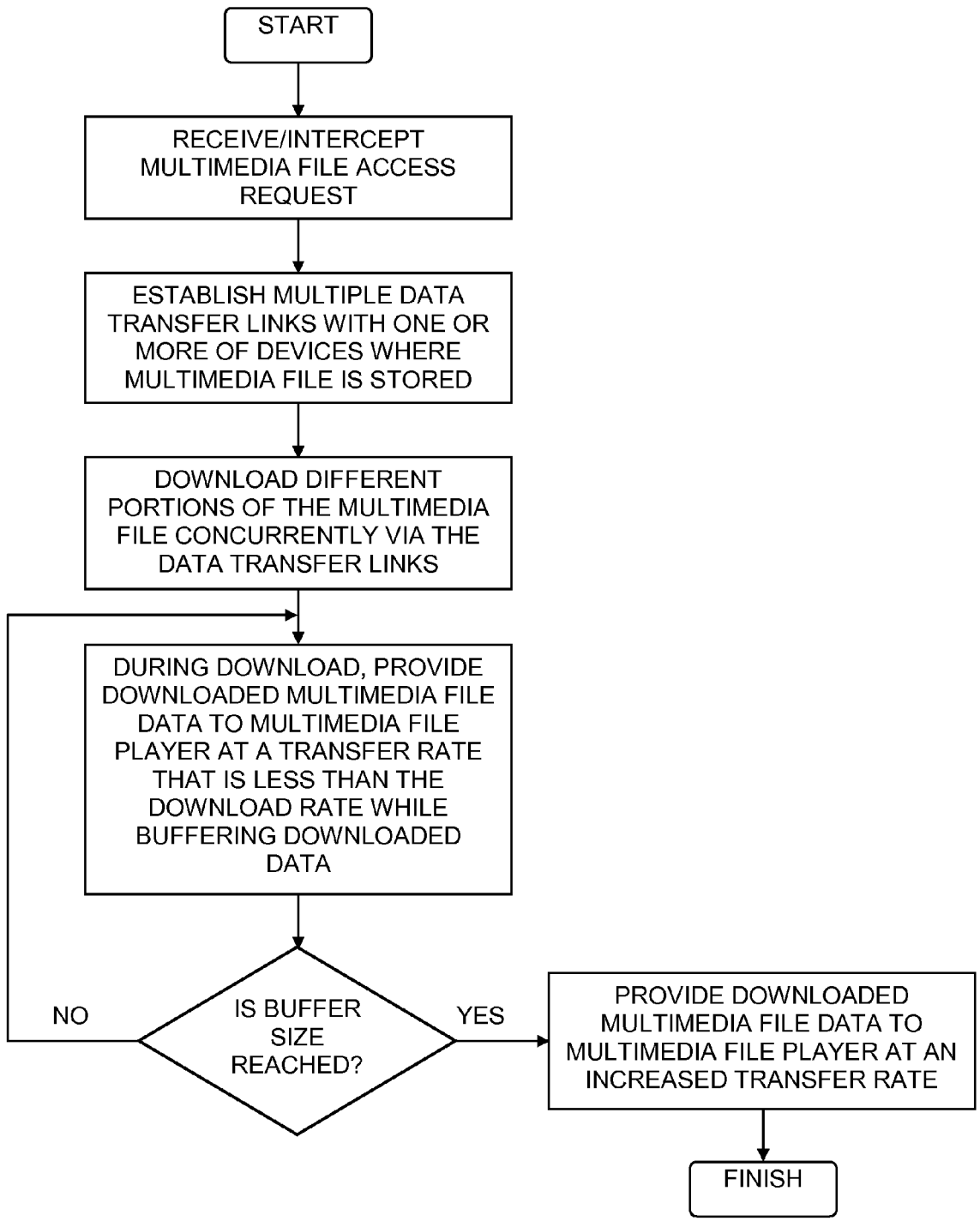
FIG. 5 which is a simplified flowchart illustration of an alternative exemplary method of operation of accelerator 104 of FIG. 1, operative in accordance with an embodiment of the present invention.

Reference is now made to FIG. 5 which is a simplified flowchart illustration of an alternative exemplary method of operation of accelerator 104 of FIG. 1, operative in accordance with an embodiment of the present invention. The method of FIG. 5 is substantially similar to the method of FIG. 3 above with the notable exception that while a multimedia file is downloaded as described hereinabove, accelerator 104 provides downloaded multimedia file data to multimedia file player 106 in the order in which the data appear in the multimedia file, but does so at a rate that is less than the download rate. As there is a difference between the download and transfer rates, accelerator 104 buffers downloaded data until a buffer size (BS) is reached, whereupon the data transfer rate to player 106 is increased, such as equal to the play rate, the download rate, or the maximum rate at which player 106 can receive data transferred to it. In one embodiment BS is determined by the formula:

$$BS = DR*FS/(PR+DR)$$

In one embodiment of the present invention, the determined size of a next portion to be downloaded may be limited to a predefined size in favor of utilizing additional data transfer links. For example, while the above calculations may result in the next portion to be a 3 MB segment to be downloaded using one data transfer link, the portion may instead be downloaded using 3 data transfer links of 1 MB each, thereby benefiting from a greater overall download rate.

In one embodiment of the present invention, if the determined size of a next portion to be downloaded equals, exceeds, or comes within a predefined distance from the end of the multimedia file, the remainder of the multimedia file is divided into a number of equally-sized portions, such as where the number of portions is equal to the current number of data transfer links, and each of these portions are then downloaded via separate data transfer links as previous portions are completely downloaded.

In one embodiment of the present invention, if player 106 has finished playing all downloaded portions of the multimedia file, yet more of the multimedia file remains to be downloaded, a predefined amount of data may be buffered, such as three seconds worth of data at the expected play rate.

In one embodiment of the present invention, the number of data transfer links is set to the value given by the formula:

$$INT(PR/DR)+1.$$

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A multimedia file transfer system comprising:
    a redirector configured to identify a request to access a multimedia file via a network; and
    an accelerator configured to
        respond to said request by identifying at least one physical data storage device on which at least a portion of said multimedia file is stored,
        establish a plurality of data transfer links via said network with any of said devices,
        download a different portion of said multimedia file via each of said data transfer links, wherein any of said portions are downloaded at least partly concurrently,
        provide, at least partly concurrently while downloading any of said portions, downloaded multimedia file data to a multimedia file player in the order in which said data appear in the multimedia file,
        determine, in advance of downloading a next portion of said multimedia file, a size of said next portion in accordance with a predefined function of
            a) a rate at which said multimedia file is downloaded, and
            b) a current play rate of any of said portions of said multimedia file preceding said next portion,
        specify to any of said devices said next portion to be downloaded while indicating said size of said next portion, and
        download said next portion of said multimedia file,
    wherein said redirector and said accelerator are implemented in either of
        a) computer hardware, and
        b) computer software embodied in a non-transitory, computer-readable storage medium.

2. A system according to claim 1 wherein said accelerator is configured to indicate to any of said devices, to which said accelerator has established any of said data transfer links, a byte offset demarcating the beginning of a portion of said multimedia file to be downloaded, and the number of bytes in the portion to be downloaded.

3. A system according to claim 1 wherein said accelerator is configured to provide said downloaded multimedia file data to said multimedia file player after buffering a predefined amount of said data.

4. A system according to claim 1 wherein either of said redirector and said accelerator are executed by either of a modem and a router.

5. A system according to claim 1 wherein said multimedia file player is assembled with either of said redirector and said accelerator.

6. A system according to claim 1 wherein said accelerator is configured to determine the size of said next portion of said multimedia file to be downloaded where said predefined function is of the product of said download rate of said multimedia file and the amount of time remaining until all of said portions of said multimedia file preceding said next portion will have been played at said current play rate.

7. A system according to claim 1 wherein said download rate is any of
    the fastest download rate achieved at any time during the download of any portion of said multimedia file,
    the slowest download rate achieved at any time during the download of any portion of said multimedia file,
    the average download rate of all downloaded portions of said multimedia file, and the download rate of the most recently downloaded portion of said multimedia file.

8. A system according to claim 1 wherein said accelerator is configured to determine the size of said next portion of said multimedia file to be downloaded as $$\frac{PPS \times DR}{PR - DR}$$

where DR is said download rate of said multimedia file, PR is said current play rate of said multimedia file, and PPS is the amount of data yet to be played of all portions of said multimedia file preceding said next portion at said current play rate, and where PR>DR.

9. A system according to claim 1 wherein said accelerator is configured to provide said downloaded multimedia file data to said multimedia file player at a data transfer rate that is less than said download rate of said multimedia file.

10. A system according to claim 9 wherein said accelerator is configured to buffer said downloaded data until a predetermined buffer size is reached, whereupon said data transfer rate to said player is increased.

11. A system according to 10 wherein said buffer size is determined by the formula $$DR*FS/(PR+DR)$$

where DR is said download rate of said multimedia file, PR is said current play rate of said multimedia file, and FS is the size of said multimedia file.

12. A system according to claim 1 wherein said accelerator is configured to download a remainder of said multimedia file in a plurality of equally-sized portions where a determined size of a next portion to be downloaded equals, exceeds, or comes within a predefined distance from the end of said multimedia file.

13. A system according to claim 1 wherein said accelerator is configured to download and buffer a predefined amount of said multimedia file if said player has finished playing all downloaded portions of said multimedia file while more of said multimedia file remains to be downloaded.

14. A system according to claim 1 wherein said accelerator is configured to determine the number of said data transfer links using the formula $$INT(PR/DR)+1$$

where DR is said download rate of said multimedia file and PR is said current play rate of said multimedia file.

15. A multimedia file transfer system according to claim 1 wherein said accelerator is configured to determine the size of said next portion such that said next portion will be completely downloaded when all of said portions of said multimedia file preceding said next portion will have been played.

16. A multimedia file transfer method comprising:
identifying at least one physical data storage device on which at least a portion of a multimedia file is stored;
establishing a plurality of data transfer links via said network with any of said devices;
downloading a different portion of said multimedia file via each of said data transfer links, wherein any of said portions are downloaded at least partly concurrently;
providing, at least partly concurrently with downloading any of said portions, downloaded multimedia file data to a multimedia file player in the order in which said data appear in the multimedia file;
determining, in advance of downloading a next portion of said multimedia file, a size of said next portion in accordance with a predefined function of
a) a rate at which said multimedia file is downloaded, and
b) a current play rate of any of said portions of said multimedia file preceding said next portion;
specifying to any of said devices said next portion to be downloaded while indicating said size of said next portion; and
downloading said next portion of said multimedia file.

17. A method according to claim 16 and further comprising indicating to any of said devices a byte offset demarcating the beginning of a portion of said multimedia file to be downloaded, and the number of bytes in the portion to be downloaded.

18. A method according to claim 16 and further comprising providing said downloaded multimedia file data to said multimedia file player after buffering a predefined amount of said data.

19. A method according to claim 16 wherein said downloading step comprises determining the size of said next portion of said multimedia file to be downloaded where said predefined function is of the product of said download rate of said multimedia file and the amount of time remaining until all of said portions of said multimedia file preceding said next portion will have been played at said current play rate.

20. A method according to claim 16 wherein said downloading step comprises determining said download rate as any of
the fastest download rate achieved at any time during the download of any portion of said multimedia file,
the slowest download rate achieved at any time during the download of any portion of said multimedia file,
the average download rate of all downloaded portions of said multimedia file, and
the download rate of the most recently downloaded portion of said multimedia file.

21. A method according to claim 16 and further comprising determining the size of said next portion of said multimedia file to be downloaded as $$\frac{PPS \times DR}{PR - DR}$$

where DR is said download rate of said multimedia file, PR is said current play rate of said multimedia file, and PPS is the amount of data yet to be played of all portions of said multimedia file preceding said next portion at said current play rate, and where PR>DR.

22. A method according to claim 16 and further comprising providing said downloaded multimedia file data to said multimedia file player at a data transfer rate that is less than said download rate of said multimedia file.

23. A method according to claim 22 and further comprising buffering said downloaded data until a predetermined buffer size is reached, whereupon said data transfer rate to said player is increased.

24. A method according to 23 and further comprising determining said buffer size by the formula $$DR*FS/(PR+DR)$$

where DR is said download rate of said multimedia file, PR is said current play rate of said multimedia file, and FS is the size of said multimedia file.

25. A method according to claim 16 and further comprising downloading a remainder of said multimedia file in a plurality of equally-sized portions where a determined size of a next portion to be downloaded equals, exceeds, or comes within a predefined distance from the end of said multimedia file.

26. A method according to claim 16 and further comprising downloading and buffering a predefined amount of said multimedia file if said player has finished playing all downloaded portions of said multimedia file while more of said multimedia file remains to be downloaded.

27. A method according to claim 16 and further comprising determining the number of said data transfer links using the formula $$INT(PR/DR)+1$$

where DR is said download rate of said multimedia file and PR is said current play rate of said multimedia file.

28. A multimedia file transfer method according to claim 16 wherein said determining step comprises determining said size of said next portion such that said next portion will be completely downloaded when all of said portions of said multimedia file preceding said next portion will have been played.

* * * * *